United States Patent
Wu et al.

(10) Patent No.: US 10,872,025 B1
(45) Date of Patent: Dec. 22, 2020

(54) AUTOMATIC PERFORMANCE TESTING AND PERFORMANCE REGRESSION ANALYSIS IN A CONTINUOUS INTEGRATION ENVIRONMENT

(71) Applicant: The MathWorks, Inc., Natick, MA (US)

(72) Inventors: Meng-Ju Wu, Wellesley, MA (US); Seihyung Lee, Westborough, MA (US); Ganesh Krishnamurthy, Ashland, MA (US); Murali Gopinathan, Shrewsbury, MA (US); Robert O. Aberg, Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 4 days.

(21) Appl. No.: 16/237,146

(22) Filed: Dec. 31, 2018

(51) Int. Cl.
G06F 11/34 (2006.01)
G06F 11/36 (2006.01)
G06F 8/75 (2018.01)
G06F 8/34 (2018.01)

(52) U.S. Cl.
CPC .......... G06F 11/3466 (2013.01); G06F 8/34 (2013.01); G06F 8/75 (2013.01); G06F 11/3612 (2013.01); G06F 11/3636 (2013.01); G06F 11/3664 (2013.01); G06F 11/3672 (2013.01); G06F 11/3696 (2013.01)

(58) Field of Classification Search
CPC .......... G06F 11/3466; G06F 11/3636; G06F 11/3672; G06F 11/3664; G06F 11/3612; G06F 11/3696; G06F 8/75; G06F 8/34
USPC ................................. 717/124–161
See application file for complete search history.

(56) References Cited

U.S. PATENT DOCUMENTS

| | | | | |
|---|---|---|---|---|
| 6,018,732 A | * | 1/2000 | Bertrand | G09B 7/04 706/60 |
| 2007/0234300 A1 | * | 10/2007 | Leake | G06F 8/51 717/124 |
| 2007/0240116 A1 | * | 10/2007 | Bangel | G06F 11/3664 717/124 |
| 2009/0012761 A1 | * | 1/2009 | Bertrand | G06N 5/042 703/6 |
| 2011/0035631 A1 | * | 2/2011 | Bhinge | G01R 31/31835 714/48 |
| 2011/0289356 A1 | * | 11/2011 | Hossain | G06F 11/3672 714/38.1 |
| 2013/0326471 A1 | * | 12/2013 | Nucci | G06F 8/10 717/105 |
| 2017/0161402 A1 | * | 6/2017 | Ikram | G06F 30/3323 |
| 2017/0270036 A1 | * | 9/2017 | Alex | G06F 11/3688 |
| 2017/0337116 A1 | * | 11/2017 | Negara | G06F 11/3688 |
| 2017/0351598 A1 | * | 12/2017 | Rauenzahn | G06F 11/3688 |
| 2019/0138428 A1 | * | 5/2019 | Sumitomo | G06F 8/75 |

* cited by examiner

*Primary Examiner* — Marina Lee
(74) *Attorney, Agent, or Firm* — Kacvinsky Daisak Bluni. PLLC

(57) ABSTRACT

A performance testing and analysis environment performs tests on programming code and identifies any performance regressions. Tests exhibiting performance regressions are rerun, and the initial regressions are confirmed as genuine regressions or not. Analysis of the code under test and the performance under the tests are analyzed. The root causes of the performance regressions are identified. The process is fully automated and is performed quickly.

29 Claims, 19 Drawing Sheets

| testpoint | Baseline Job | Regressed Job |
|---|---|---|
| matlab/lxe/performance/lxeGreyUnitTests/tLoadIR/IrLoadTimeFromP | J1004641@Blangcore | J1005540@Blangcore |
| matlab/lang/performance/tif/doubleVector | J1001415@Blangcore | J1003103@Blangcore |
| matlab/general/matlab_startup/performance/tMATLABStartupNojvm/Stage | J1004641@Blangcore | J1005540@Blangcore |

*Fig. 3D*

| Foo's self time | Foo's total time | Does foo cause regression? |
|---|---|---|
| ∧ (increase) | ∧ | If foo's call-counts increases<br>    foo's caller causes regression<br>otherwise<br>    foo itself causes regression<br>If foo's callees' total time also increase<br>    One or several foo's callees also cause regression |
| - (no change) | ∧ | No, foo's callees |
| ∧ (decrease) | ∧ | No, foo's callees |
| ∧ or - or ∨ | - or ∨ | No |

*Fig. 7*

| Regression | Rate | Baseline (sec) | Regression (sec) | Comparison Table | Baseline Job | RFF |
|---|---|---|---|---|---|---|
| matlab/elmat/performance/tisequal/SparseWithFull/[size=value1]::NA::NA::NA (UPT) (History) (Code search) (Gecko search) | 23.77% | 0.0387 | 0.0479 | Table | 855455 | RFF |
| matlab/lxe/performance/lxeGreyUnitTests/tSubsrefWithStrings/curlyBraceAsString/NA::NA::NA (UPT) (History) (Code search) (Gecko search) | 17.40% | 0.0339 | 0.0398 | Table | 852606 | RFF |
| matlab/ops/performance/tmtimes_sparse/test_Tridiagonal_Vector/[Op=RR,size=value1]::NA::NA::NA (UPT) (History) (Code search) (Gecko search) | 13.33% | 0.0015 | 0.0017 | Table | 855455 | RFF |
| matlab/lxe/performance/lxeGreyUnitTests/tSubsrefWithStrings/parenAsString/NA::NA::NA (UPT) (History) (Code search) (Gecko search) | 13.17% | 0.0357 | 0.0404 | Table | 852606 | RFF |

Fig. 8

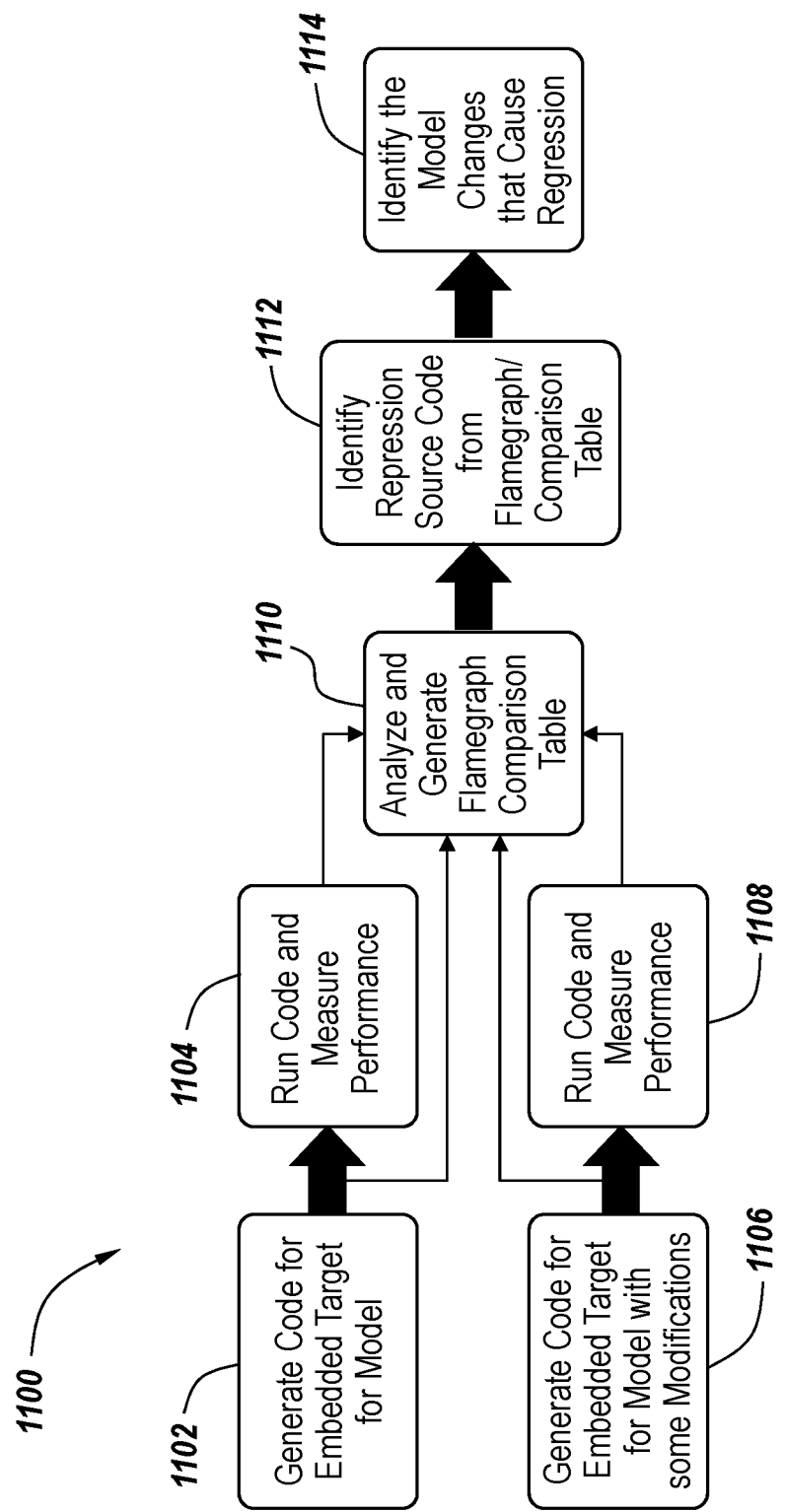

AUTOMATIC PERFORMANCE TESTING AND PERFORMANCE REGRESSION ANALYSIS IN A CONTINUOUS INTEGRATION ENVIRONMENT

SUMMARY

In accordance with one aspect of the exemplary embodiments, a method is performed by a processor of a computing device. In accordance with this method, performance information is recorded during performance tests performed on programming code. The performance tests may measure at least one of memory usage, processor time, number of calls, throughput, processor time, processor performance counters, OS performance counters, network traffic, network time, disk time, a number of input/output operations or other measurable metrics. A performance regression in one or more of the above mentioned metrics that occurred at one or more of the performance tests is identified. The identifying comprises analyzing the recorded performance information to identify a performance change that occurred at the one or more performance tests and determining whether the performance regression is observable in that the performance regression satisfies one or more observability criteria. This may entail, for example, rerunning the one or more performance tests to determine that the performance change is reproducible. If the performance change is reproducible, the performance regression is deemed to be observable in that case. The identified performance regression is analyzed to generate a data structure for callable units of functionality of the programming code executed during performing the one or more performance tests. The data structure contains call relationships among the callable units of functionality of the programming code and performance information of the callable units of functionality of the programming code. For each of at least two callable units of functionality, the data structure is analyzed to identify a cause of the identified performance regression. Information about the identified cause is output on an output device.

At least one run of the rerunning of a given one of the one or more performance test may be run on a different platform than a platform on which the given performance test has been run. The output information may include an identification of at least one modification for the identified portion of the programming code that likely is the identified cause of the identified performance regression. The programming code may be a graphical model, may be associated with a graphical model (e.g., may represent the functionality of the graphical model) or may be a textual model. The cause of the identified performance regression may be at least one callable unit of functionality in the programming code. The callable unit of functionality may be at least one of a function, procedure, a subroutine, a method or an element of a model, such as a subsystem, a model reference, a model block, a state transition chart, a finite state machine, an atomic subchart, a custom storage class, a signal object, or a sample time task grouping. The callable unit of functionality may be a function and each line in the function (or subroutine and each line in the subroutine). For graphical models, the callable unit of functionality may be the function and each line in the function generated from the models.

In some embodiments, the programming code may be for a graphical model and the cause of the performance regression may include a component in the programming code. The method may include identifying that a change in the graphical model that caused the generation of the performance regression includes a component in the programming code and identifying a change in the graphical model that caused the generation of the component.

In some embodiments, determining that the performance regression is observable comprises rerunning the one or more performance tests to determine that the performance regression is reproducible. The observability criteria may be configurable. The outputting of information may comprise generating a report regarding the identified cause. The owner of the at least one callable unit functionality that is the identified cause may be identified, and the report may be sent to the owner.

In some embodiments, the analyzing the identified observable performance regression to generate a data structure for callable units of functionality of the programming code executed during performing the one or more performance tests may comprise generating a call graph for the callable units of functionality of the programming code executed during the one or more performance tests. In addition, the method may include simplifying the call graph by applying at least one anchor point to the call graph.

Instructions for causing a processor of a computing device to perform the method may be stored on a non-transitory computer-readable storage medium.

BRIEF DESCRIPTION OF THE DRAWINGS

FIG. 3D depicts an example of an initial regression list.

FIG. 7 illustrates an example of a table containing logic to be used to determine whether a callable unit of functionality is a cause of performance regression.

FIG. 8 illustrates an example of a report that may be produced to forward the gathered information regarding performance regressions.

FIG. 11 depicts an exemplary workflow for a case in which the regressions concern code generated for an embedded target from a model in an exemplary embodiment.

DETAILED DESCRIPTION OF THE INVENTION

Figure 1A:
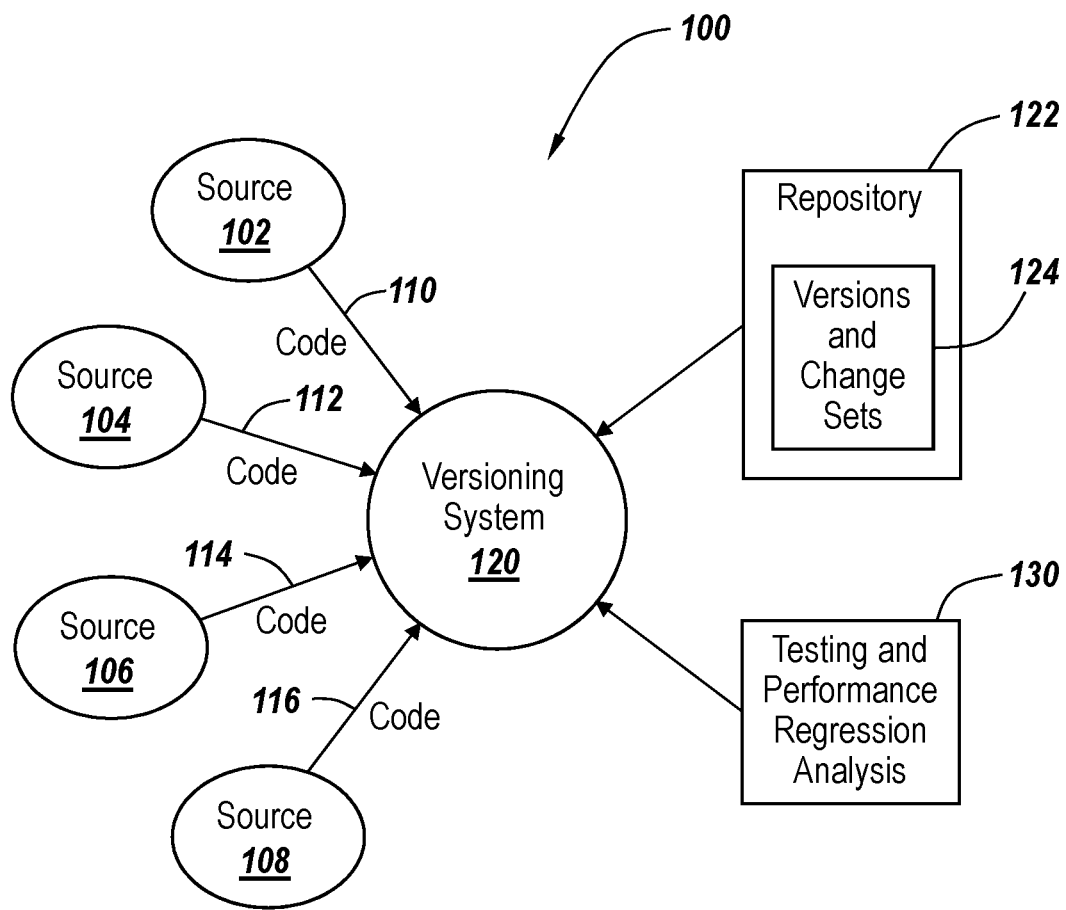
FIG. 1A depicts an example of an integrated development environment in which automated performance regression analysis is performed for an exemplary embodiment.

Performance testing tests portions of software to determine whether the portions perform as intended in terms of responsiveness/stability. Test results for performance metrics, such as processor time, processor performance counters, OS performance counters, number of calls, throughput, network traffic, network time, memory usage, disk time, number of input/output operations and the like, may be gathered by the performance tests for one or more callable units of functionality. Callable units of functionality may be, for example, components such as functions, procedures, subroutines, methods, etc., of the program code of the software being tested. A performance regression occurs when the performance test yields results evidencing a non-negligible impact in performance between two executions of the performance test on the program code of the software being tested. Regression analysis seeks to explain what changes, e.g., changes to the software, software/hardware environment in which the software/code being tested is executed, operating system, and/or hardware resource management, caused the performance regression.

Unfortunately, conventionally such performance regression analysis is very labor intensive and very time consuming. It may take several hours or even days for a performance expert to identify a performance regression and to identify the cause of the performance regression. The root causes of the performance regression can be very complicated because a software's performance depends on the interactions among operating system, the hardware on which the performance test is run, and the software. For example, different execution environments/configurations can change a software's performance characterizations and/or bottlenecks significantly. For instance, a virtual machine and a physical computing device have very different memory access latencies, which might change a software from being characterized as CPU-bound to being characterized as memory-bound. As a further example, implementing the same algorithm in source code differently can change the final executable binary generated by the compiler, and the CPU can schedule this new generated binary differently in the CPU pipeline and introduce performance regression. Further, a programmer can change the memory accesses patterns in an algorithm and cause the untouched memory pool to start to leak memory. To understand how the different pieces coming from the operating system, the hardware, and the software are interacting with each other, and to identify which profiling tool should be used in different situations may be very time consuming and may require a very steep learning curve. The on-demand manual way for investigating performance regressions is not scalable when there are a large number of programmers consistently making changes to the software concurrently and introducing tens to hundreds of performance regressions every day.

Performance testing can be done on a per job basis, where a job is a unit of code for which a test is to be applied. In some exemplary embodiments, the job may be an executable binary, such as MATLAB.exe and Simulink.dll executable binaries found with the Simulink and MATLAB products from The MathWorks, Inc. of Natick, Mass. Binaries are machine codes that can be executed by CPU. The job may include multiple callable units of functionality. An example of a job is, for example, a piece of software to compute the multiplication of two matrices. A performance test may be performed on this job using two matrices with actual values. The performance of the software, particularly the part of the software that performs the multiplication, can be evaluated, e.g., by tracking the time needed to complete the multiplication, among other things. The performance test can be rerun many times, and a performance regression can be identified, e.g., the time needed to complete the job increases. The regression analysis of the exemplary embodiments seeks to automatically identify whether the performance regression is a true performance regression, and if the performance regression is a true performance regression, the causes of the performance regression (e.g., a programmer altered the software, the software is running on different hardware, the software is running with hardware with a new operating system, etc.) are identified.

Conventionally, identifying the causes of a performance regression manually is time consuming and labor intensive. The manual process is also not scalable when there are hundreds to thousands of performance regressions that must be investigated. As a result, the manual conventional regression analysis may take a great deal of time and require a substantial effort.

In contrast, exemplary embodiments may allow such performance regression analysis to be performed in a matter of minutes rather than hours or days, with a high precision regarding the causes of the performance regressions. An integrated and automated solution may be provided so that performance regressions are identified, determined to be reproducible, and analyzed programmatically. In addition, the exemplary embodiments may also programmatically identify, for example, what callable units of functionality in the code under test are responsible for a performance regression, may identify the code change associated with the identified callable unit of functionality, may identify what system changes caused the performance regression, may identify hardware-related performance issues that caused the performance regression, may identify what compiler change caused the performance regression, and may identify what change in a graphical model caused the performance regression. This list of possible causes for a performance regression is intended to be merely illustrative and not limiting. A report may be generated and sent to appropriate parties to rectify the regression.

The exemplary embodiments are suitable for software environments in which many developers are working on portions of a shared software product. In software engineering, there is a notion of continuous integration, which is the practice of merging all developer working copies of programming code under development to a shared repository, e.g., several times a day. A change set is a set of code that contains changes that should be treated as indivisible. The shared repository for code may store the change sets and assign version numbers for the files in the change sets. The repository for code is handled by a versioning system, which allows developers to track and provides developers control over changes to source code. The versioning system is a database that tracks and provides control over changes in source code.

The combination of performance testing and performance regression analysis is useful at the time that the change sets are checked into the versioning system. When a developer checks a change set into the versioning system, the developer is asking that the code in the change set be introduced into the software that the change set is part of. When introducing the change set to the software, it is useful to understand if the code in the change set introduces any performance regressions. This understanding permits such performance regressions to be rectified before becoming part of the software. That said, the performance regression analysis and system described herein is not limited to being practiced with a versioning system at the time of submission to the versioning system. More generally, the performance regression analysis and system described herein is useful whenever software has changed and performance testing is performed. The exemplary embodiments provide quick and efficient identification of the causes of performance regressions.

The exemplary embodiments may also be used in conjunction with configuration management systems in addition to versioning systems. The configuration management systems may be used to keep track of what versions constitute a configuration.

FIG. 1A shows an example of an environment 500 in which continuous integration is deployed for developing one or more pieces of software. Multiple sources 102, 104, 106, and 108, such as developers, provided versions of code 110, 112, 114, and 116, which can include new code or modifications to existing code, to a versioning system 120. In some embodiments the versioning system may be a configuration management system with versioning support. Each source 102, 104, 106, and 108 defines and submits code to the versioning system 120. The code in a submission constitutes a change set. A source 102, 104, 106, and 108 may submit multiple change sets together. A versioning system is a database that tracks and provides control over changes to source code. The submitted code 110, 112, 114, and 116 may be combined to create a job 124 containing an executable version of the submitted code 110, 112, 114, and 116, and this job is stored in the repository 122. The repository 122 may be realized as local storage or may be realized as distributed storage. The job 124 is run in the testing and performance regression analysis environment 130 in an exemplary embodiment. In other words, one or more performance tests are run on the code in the job. Moreover, some of the performance tests may be run multiple times on the code in the job.

Figure 1B:
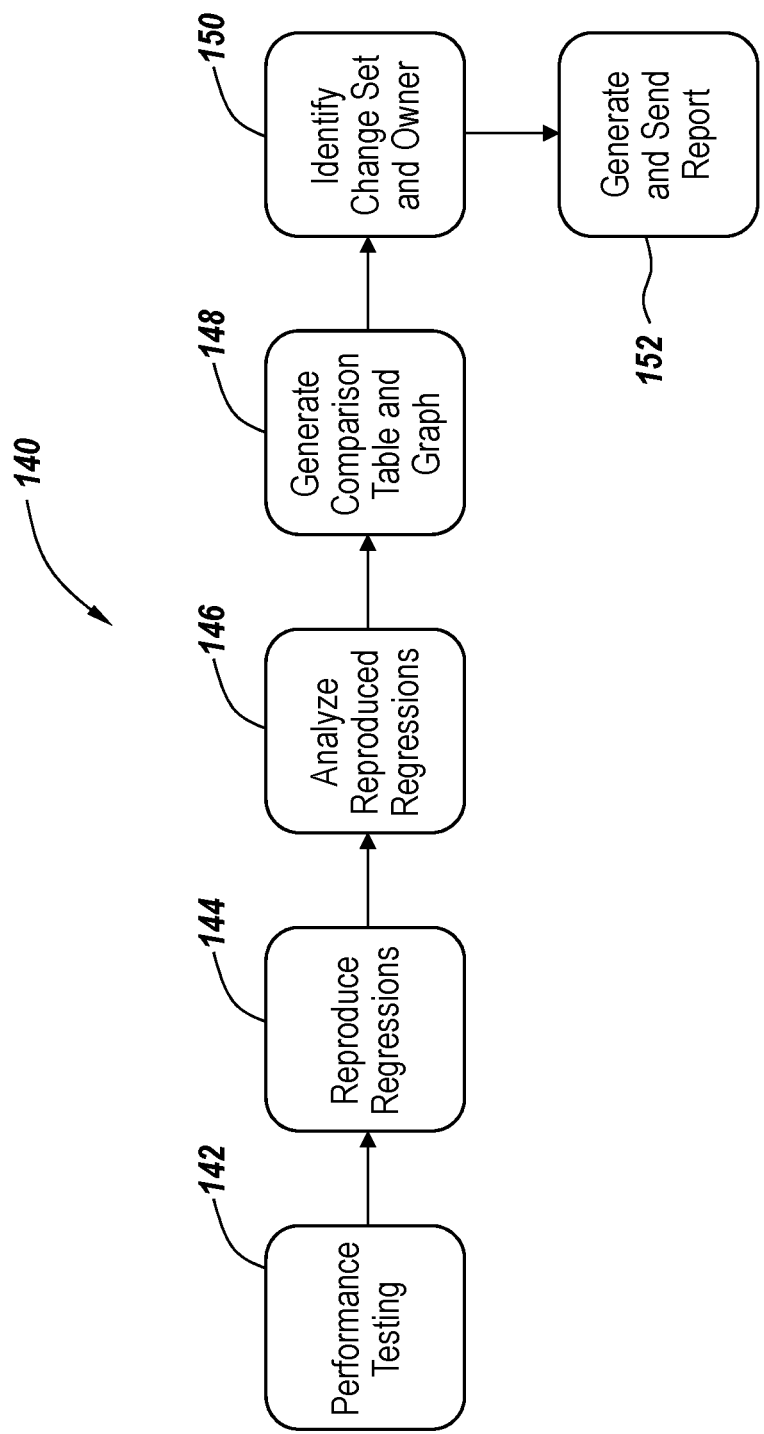
FIG. 1B depicts an example of an illustrative workflow for an exemplary embodiment described herein.

FIG. 1B illustrates a high level workflow 140 implemented by the testing and performance regression analysis environment 130 in an exemplary embodiment. The discussion below first will review the workflow at a high level and then provide a more detailed review of the workflow with reference to subsequent figures. The workflow 140 begins with performance testing being initiated 142. The testing platform (see 130 in FIG. 1A) performs performance tests on newly received jobs as will be described below. The performance tests generate performance data, which can be stored in the form of one or more data structures, such as relational tables or records, in a database. Alternatively, the data structures may store the performance information separate from a database, such as in a proper file format in the file system. Any observable performance change is identified and reported based on the collected performance data after running the tests. An observable performance change may take the form of an improvement or may take the form of a performance regression. "Observable" in this context means that the performance change between jobs (e.g., between the job under test and previous version(s) of the job) should be larger than the anticipated run-to-run variation. Observability criteria may be established to determine whether a performance change is "observable" and hence, if the change is a performance regression, the performance regression is observable. For example, a performance change may need to occur over multiple test iterations to be deemed observable. In such a case, the performance regression may be determined to be reproducible and hence observable. A threshold, such as 10 percent change, may be established for a performance change to be observable, as default. The environment 130 may also allow a user to set the observability criteria, such as by changing the threshold and metrics (e.g. execution time, memory usage, cache misses, disk usage, etc.).

Although the exemplary embodiments are suitable for integration in a large scale environment in which jobs are submitted on an ongoing basis and performance testing is performed on those jobs, it should be appreciated that exemplary embodiments may also work with other environments. The discussion of the continuous integration environment is intended to be merely illustrative of a use case and not limiting.

In order to ensure that the regression is not transitory due to the nature of measurement and system noise (it is inherent that any measurement and system has a certain level of noise) and is a persistent issue the performance test may be run multiple times to reproduce regressions and to ensure that the regression is not transitory as indicated by 144 in FIG. 1B.

The exemplary embodiments then analyze the performance information for the reproduced regressions in 146. The analysis may be performed by running one or more performance analyzers on the same test repeatedly to find the causes. Analysis is performed on both a baseline job (usually a most recent version of the job before the submission of the job under test) and a regressed job to identify one or more portions of code that has been changed and resulted in a performance regression.

A comparison table may be generated (step 148). The comparison table may show performance metric data for comparing the baseline case before the programming code was modified and the regressed case after the programming code has been modified. The comparison table contains executed function and its performance metrics which takes the caller-callee relationship into consideration. For example, the performance metrics can be the selftime of the function (time spent in the function itself) and the total time (time spent in the function itself and its children). The comparison table can help to identify what callable units of functionality are responsible for the regression. The comparison table represents one possible output format for the performance data. It should be appreciated that other textual or graphical formats may be generated to present the executed callable units of functionality and their performance metrics. For example, graphs such as histograms or plots may be generated. In addition, graphs containing the caller-callee hierarchy and each callable unit of functionality's performance metrics for the baseline case and the regressed case may also be generated (see 148). Such call-stack graphs may use a graphical format such as call-graph or flame graph.

Once the cause(s) (i.e., the callable units of functionalities that are responsible for the performance regression) have been identified, the exemplary embodiments may then look for how that callable unit of functionality was modified or introduced into the regressed case. To that end, the modified code that is the root cause of the regression is identified and the change set containing the callable unit of functionality can also be identified. Hence, the owner of the change set may also be identified in 150. Once the owner of the change set has been identified, the exemplary embodiment may generate and send a report to the owner and to other interested parties so that the regression may be addressed (see 152).

Figure 2A:
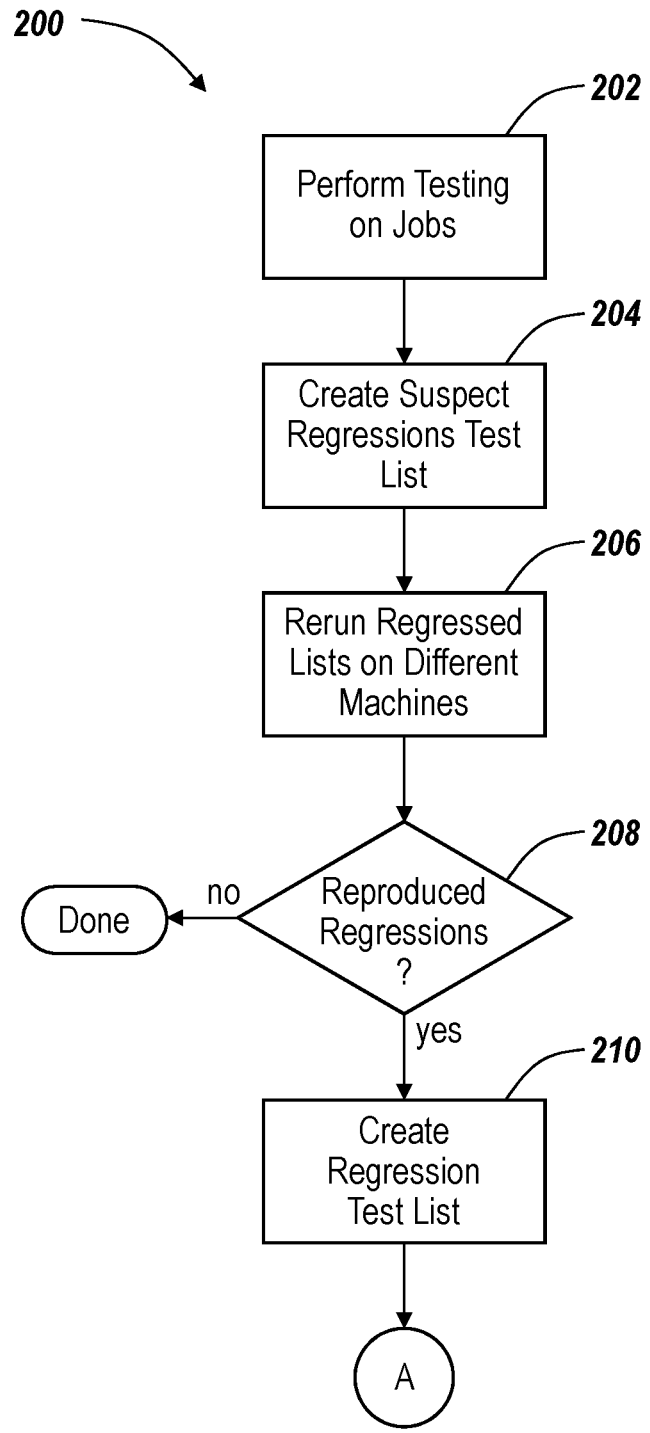
FIGS. 2A, 2B, and 2C show flowcharts illustrating examples of steps that may be performed in exemplary embodiments.
Figure 2B:
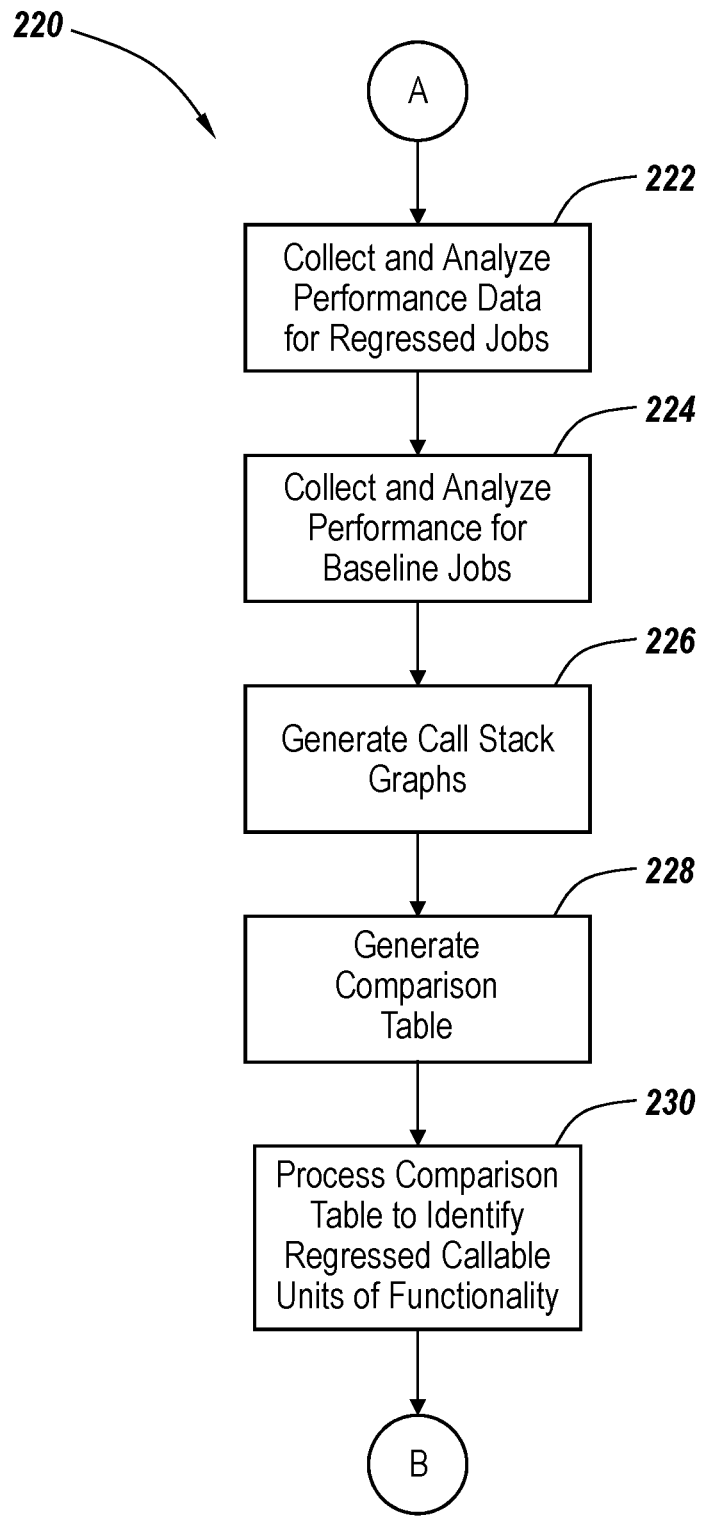
Figure 2C:
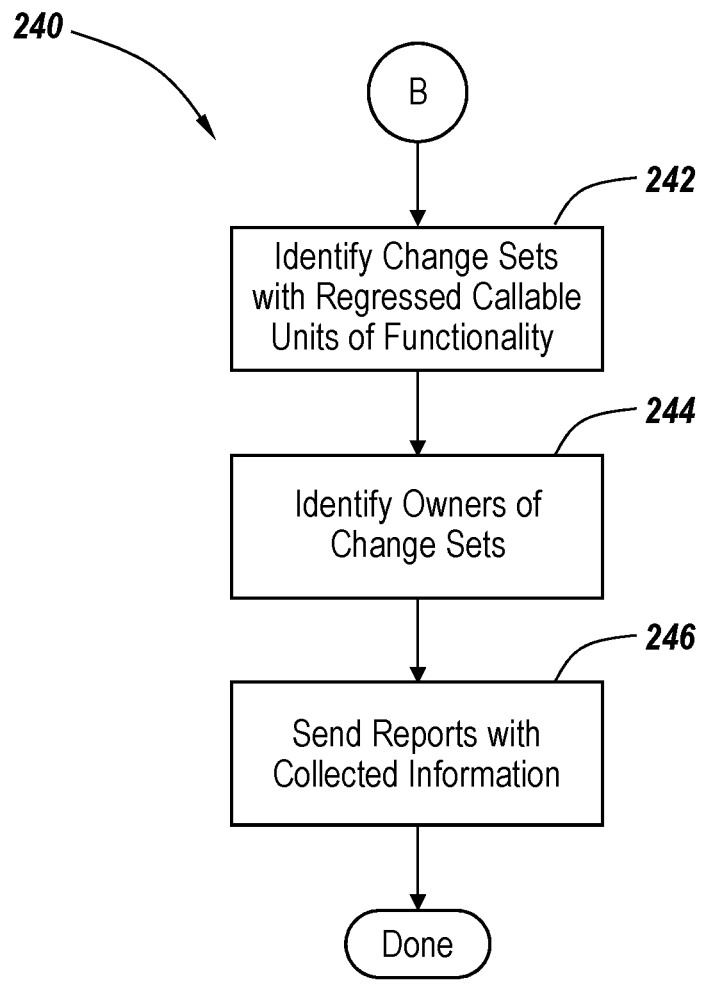

The workflow of FIG. 1B depicts only at a high level what happens in the exemplary embodiments. FIGS. 2A, 2B, and 2C provide more detail. FIGS. 2A, 2B, and 2C provide flowcharts that show the steps that may be performed in the exemplary embodiments to realize the workflow of FIG. 1. These steps may be discussed in conjunction with other figures below.

As shown in the flowchart 200 of FIG. 2A, initially performance testing is performed on jobs that are submitted to the testing platform (step 202). As was detailed above, there can be varieties of performance metrics, e.g., at least one of memory usage, processor time, processor time, processor performance counters, OS performance counters, number of calls, throughput, network traffic, network time, disk time or a number of input/output operations. Multiple runs of the same test may be performed for a job. Based upon the performance test, a suspect regression tests list may be created (step 204) by comparing the performance results between the current job and the previous jobs. This list may be stored in a data structure, such as a table, in a database, or may be stored in a file in some embodiments.

Figure 3A:
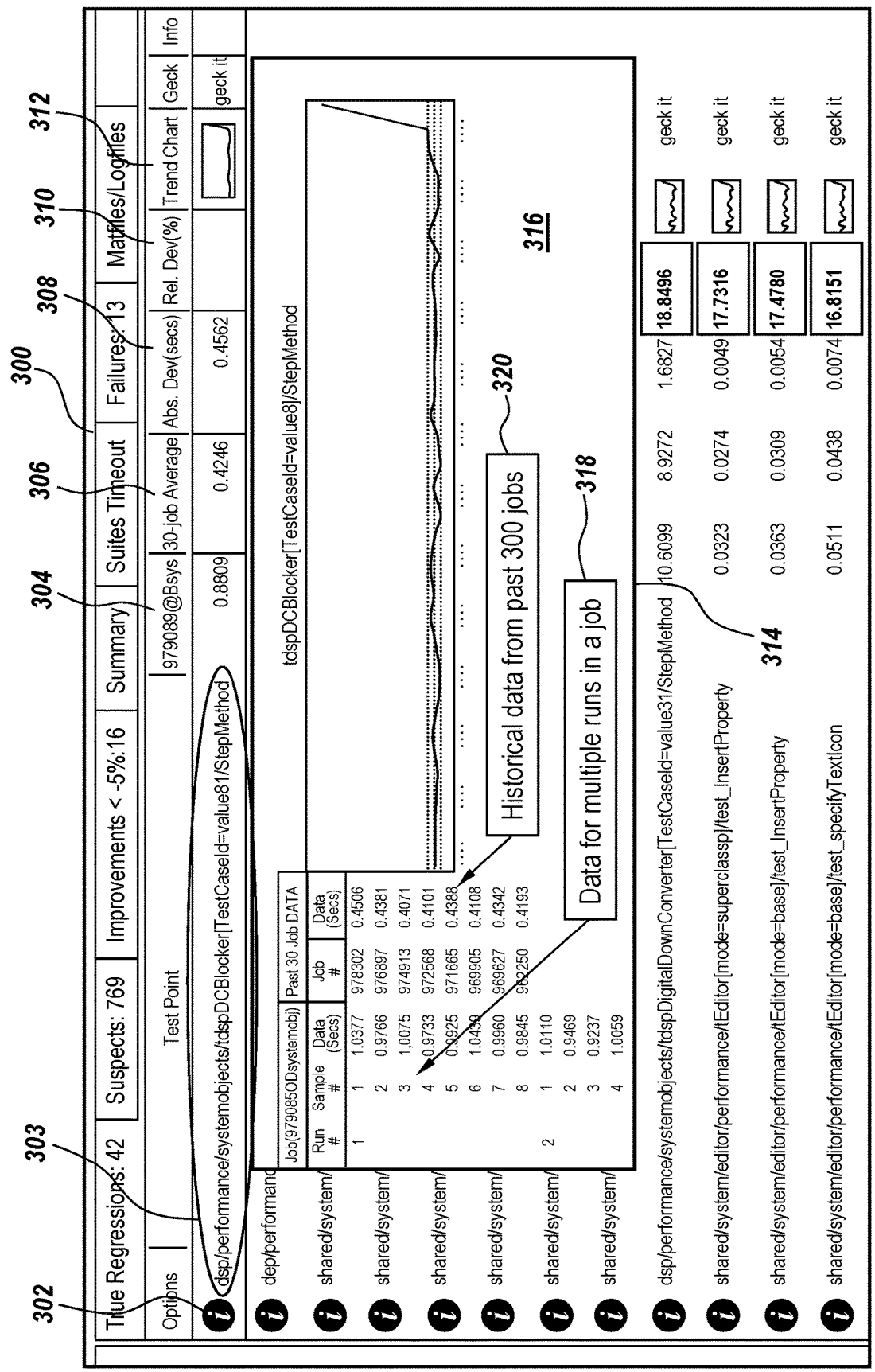
FIG. 3A depicts an example of the results of testing of one or more callable units of functionality and a display of data for historical jobs and multiple runs of a given job.

FIG. 3A depicts an example of such an initial regression test report 300. This initial regression test report 300 is generated from performance data for test runs stored in the database. This initial regression report 300 is used here to demonstrate the workflow of how a developer can identify the regression test by using the historical data. This report may be a virtualized output for a developer to read the data, and it may be part of the system. When the system runs automatically (such as when the developer does not request a virtualized regression report), the system follows the same workflow by analyzing the raw data stored in the database directly, i.e., there is no need to generate report 300. The flow chart used in the claimed automatic system is shown below. Each row, such as row 302, represents a particular test for which a performance regression was observed. In the example shown in FIG. 3A, test 303 is associated with row 302. Often, a job may be subject to multiple types of test in a test suite, and hence there can be multiple tests. Column 304 holds the performance metric value processor time (i.e., time it took for the associated code to execute) and column 306 holds an average value for that metric over thirty jobs. For each performance test, one may run the test multiple times to get a stable execution time. There is run-to-run variation. To reduce the data noise, one may run the same test multiple times and select the shortest run time as the execution time. Column 308 holds the absolute deviation in seconds between the value in column 304 and the value in Column 306. Column 310 holds a value of a relative deviation percentage. In the depicted case, the relative deviation percentage is 107.4475.

The initial regression report 300 may be constructed such that by double clicking or selecting a test 303, a display 314 appears. The display 314 may include data for multiple runs of a job 318 and historical data 320 for the past thirty jobs so as to provide more detail regarding where the performance metric values in Columns 304 and 306 are derived. (A chart 316 may be displayed (in response to selection or activation in some embodiments) to show execution time history over a period of jobs, which may be the execution time of a test running on jobs that are created in the past 30 days.

Figure 3B:
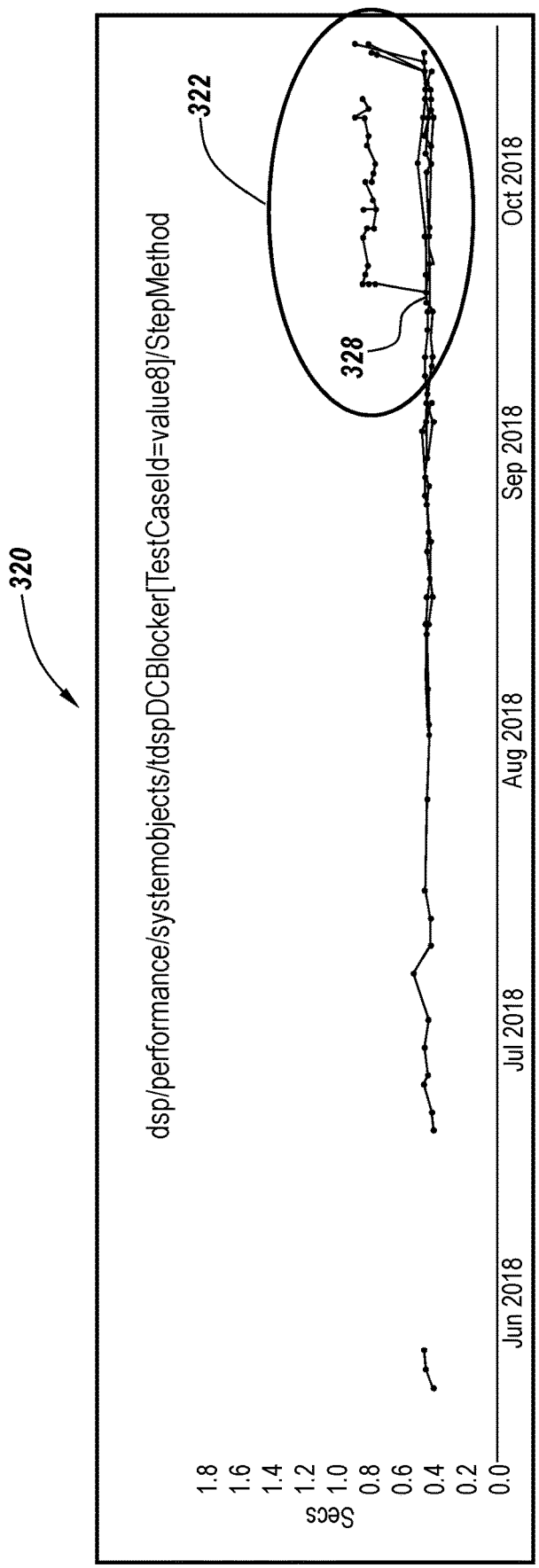
FIG. 3B is a chart illustrating an example of historical performance data and highlighting a change in the historical performance data.

The exemplary embodiments may also produce longer term charts that show some detail as to when the regression started to appear. The exemplary embodiments may in addition produce different charts that use different performance metrics. FIG. 3B shows a chart 320 having a portion 322 that includes a start point 328 for the regression. One can see that the execution time that is plotted increases substantially at point 328 and is sustained for some time. The chart is produced by graphing the historical performance metric values stored in the database for a specified time window.

The initial regression report 300 (FIG. 3A) may be generated offline. During performance testing, the performance metrics (time, memory, etc.) are recorded in the database with the job number (e.g., 979089@Bsystemobj) that is used to run tests. Once all tests are finished, a developer can access the report through a web service. At that time, the report accesses recorded data from the database and presents the results as shown in 300.

Figure 3C:
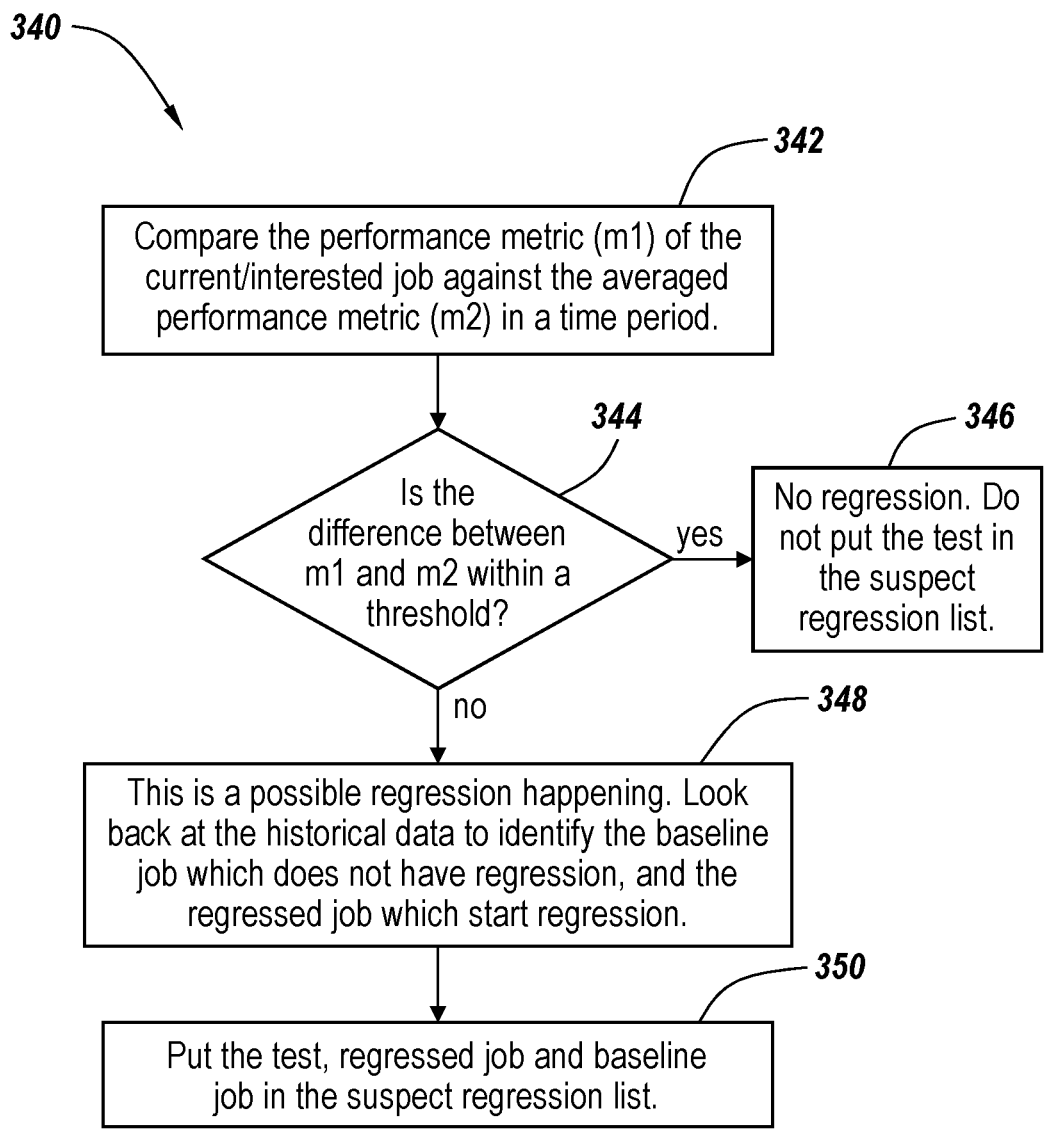
FIG. 3C is a flowchart depicting an example of steps that may be performed by exemplary embodiments in building an initial regression list.

The initial regression list 204 may be created using the approach shown in the flowchart 340 of FIG. 3C. For each test, the system compares the measured performance metric (time, memory, etc.) for the job against the averaged performance metric (average time, average memory, etc.) across a time period (step 342). The time period, for example, can be the past 30 days, the past 25 jobs, etc. This time period can be defined by developers using the system. If the difference between the current metric and the average metric is within a certain threshold (see step 344), this means that the performance change is within a tolerance level (e.g., within a system or measurement noise level), so this test does not have an observable regression (step 346). The threshold is a user defined parameter. For example, the threshold could be that the change in the execution time is 10%, the change in the memory usage is 5%, or the disk access latency is 10 ms, depending on the metric of interest. It should be appreciated that the threshold may include multiple components applied across multiple metrics. For example, when the execution time takes more than 5% longer and the disk access latency is more than 5 ms larger, the test may be deemed to represent a performance regression. On the other hand, if the difference is larger than a threshold (see step 344), the test is regressed on this job. The described approach looks back at the historical data to identify which job starts the regression, and it also identifies the baseline job which is the last job that does not have a regression (step 348). For example, FIG. 3B illustrate what the historical data looks like. The last step is saving the test, baseline job, and regressed job in the suspect regression list (step 350). FIG. 3D shows an example of such a suspect regression list 360. The list contains three columns for each suspect regression: the test 362, the baseline job 364, and the regressed job 366.

The reproducible-regression-tests list can be generated from the suspect-regression-tests list 360 FIG. 3D. The reproducible-regression-tests list includes (1) Test point 362, (2) Baseline Job number 364, and (3) Regressed Job number 366. The tests listed in the reproducible-regression-tests list may be rerun on different machines (step 206). For example, the performance testing may be run on virtual machines. The tests may be rerun on physical machines to filter out virtual machine specific issues. For example, multiple virtual machines can share the same physical machine. The hardware resource contention can distort the execution time. Furthermore, virtual machines have a high cost when calling system calls and accessing a virtualized device. Hence, a performance regression reported by virtual machines may not be reproducible on physical machines. Since the software at issue likely will run on physical machines, the primary concern may be performance regressions that are reproducible on physical machines. This example is used to illustrate the importance of reproducing the regression on different machines to avoid systematic issues, and the embodiment is not limited to this virtual machine vs. physical computing device environments. The rerunning of the test at different machines ensures that the regression is not due to simply differences in the machine, e.g., hardware differences, differences in software installed on the machines, etc., on which the initial regressions were observed.

Figure 4:
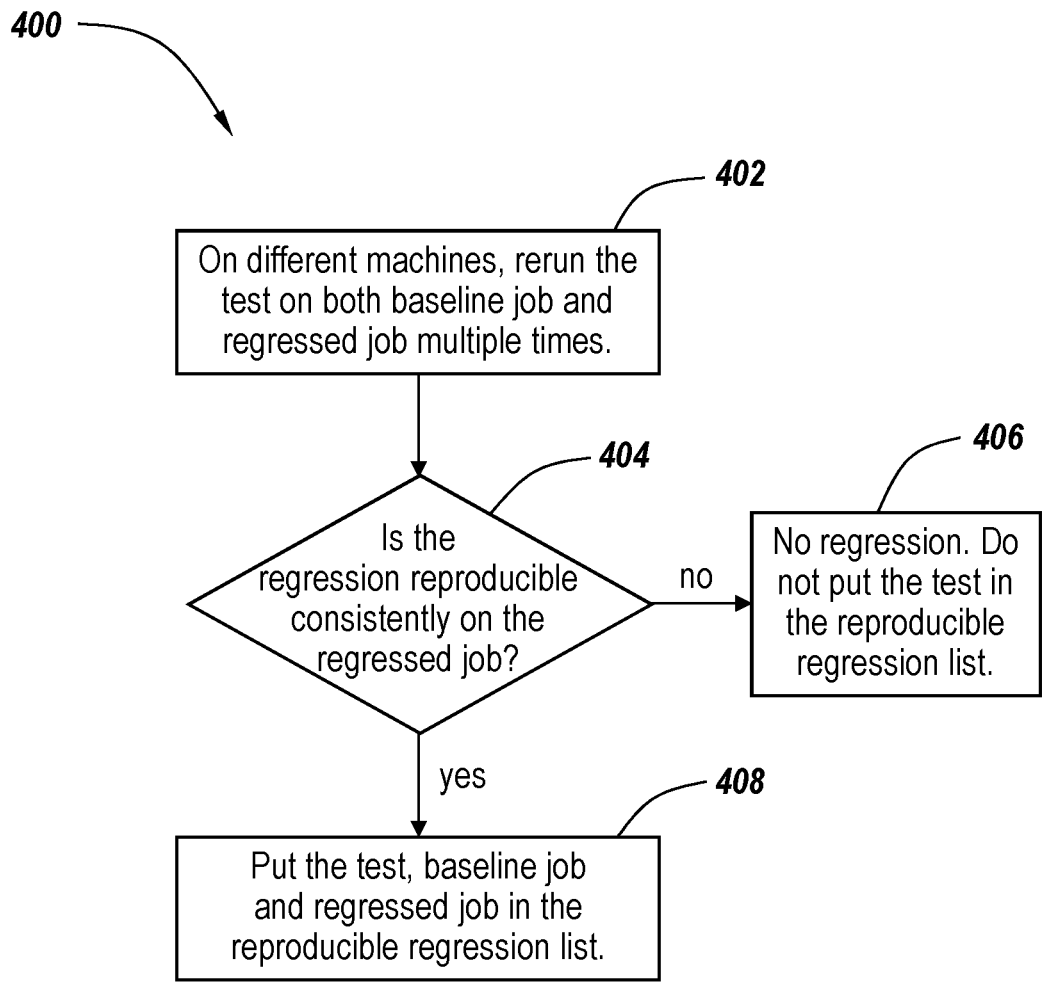
FIG. 4 is a flowchart illustrating an example of steps that may be performed in an exemplary embodiment to build a final regression list.

FIG. 4 provides a flowchart 400 that has more detail regarding how to identify reproducible tests. The exemplary embodiments may read the initial regression list and rerun each test on the regressed job and baseline job multiple times and collect performance metrics (step 402). The user can define how many times the test should be run. Then FIG. 4 shows the performance metrics for each run between the baseline job and regressed job. The shown information may be analyzed to decide if the regression is reproducible consistently (step 404). Simple run-to-run comparison or sophisticated statistical methods (like confidence level) can be employed here to decide if the regression is reproducible or not. If the regression is not consistently reproducible, the exemplary embodiments may just ignore the test (step 406). Otherwise, the test, baseline job, and regressed job are added to the reproducible-regression list (step 408); the format is like that shown in FIG. 3D.

Thus, as can be seen in FIG. 2A, a determination is made whether there are any reproducible regressions in step 208. If there are not, the process is done. Otherwise, the reproduced regressions are added to the reproducible-regression list in step 210. This completes the Reproduce Regressions portion 144 (see FIG. 1B) of the workflow.

The exemplary embodiments then analyze the reproduced regressions one-by-one (see 146 in FIG. 1B). FIG. 2B shows a flowchart 220 of example steps that can be performed to analyze such reproduced regressions. Initially, in step 222, the performance data is collected by applying profiling tools to the regressed job which run the test. During testing and reproduction steps, the system may only measure performance metrics for each test. At this step, the system applies profiling tools to further collect the information of call stacks and break the performance metric into each callable unit. For example, the testing and reproduction phase only gather the overall execution time for each test running on jobs. Profiling tools can provide the caller-callee hierarchy and the selftime for each function. A performance analysis determines how each callable unit of functionality in each job performed in the tests. The analysis determines how such callable units of functionality contributed to the performance regression. Similarly, the performance data for baseline jobs are also collected and analyzed by applying a performance analyzer in step 224. The collected profiling information may be stored in data structures that are stored in a database or in a file formant on disks. The performance data is collected by applying profiling tools (such as Xperf, Vtune). It is difficult or impossible to do the profiling and testing at the same time because profiling has its own overhead. Hence, some exemplary embodiments separate the testing and profiling phase. Profiling collects more detailed information, such as the execution time of each function and function call counts.

The exemplary embodiments may then generate one or more call stack graphs 226 (see 148 in FIG. 1B). The call stack graphs graphically depict call stacks, where each call stack contains a calling sequence of callable units of functionality for a portion of programming code. A node in the call stack graphs represents a callable unit of functionality and the directed arrows represent calls from callable units of functionality to other callable units of functionality. The exemplary embodiments may also generate detailed performance metric information for each callable unit of functionality, e.g. selftime of each callable unit. The call stack graphs may not be used in identifying the functions that cause performance regression. The call stack graphs may be sent to developers at the end, so that developers can easily understand the caller-callee hierarchy and revise their code to fix the performance regression. Profiling information may already be stored in data structures in the database and the call stack graphs may be generated from this called information held in the data structures. In order to assist with user analysis using the call stack graphs, the call stack graphs may be presented in the form of call graphs, flame graphs, and/or other graphical formats.

Figure 5A:
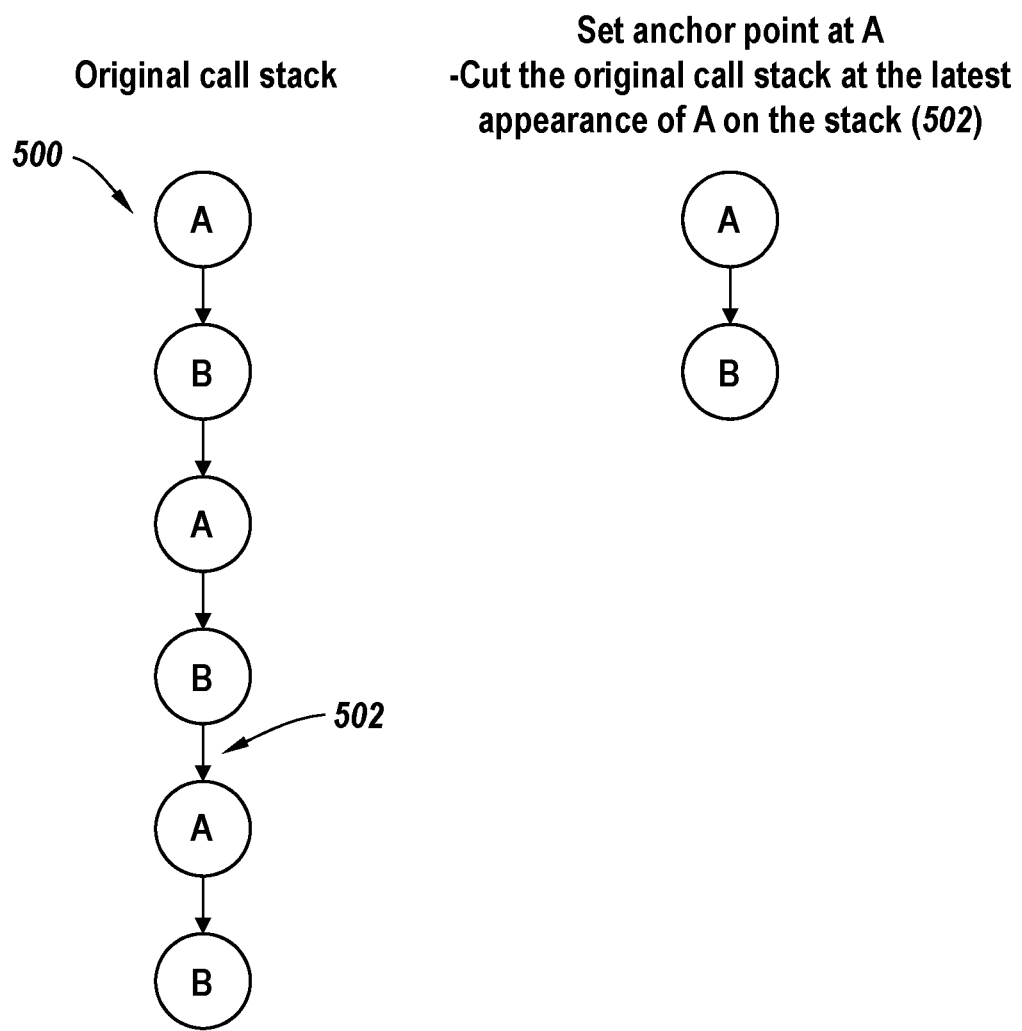
FIG. 5A is a diagram illustrating an example of the use of anchor points on an original call stack in an exemplary embodiment.
Figure 5B:
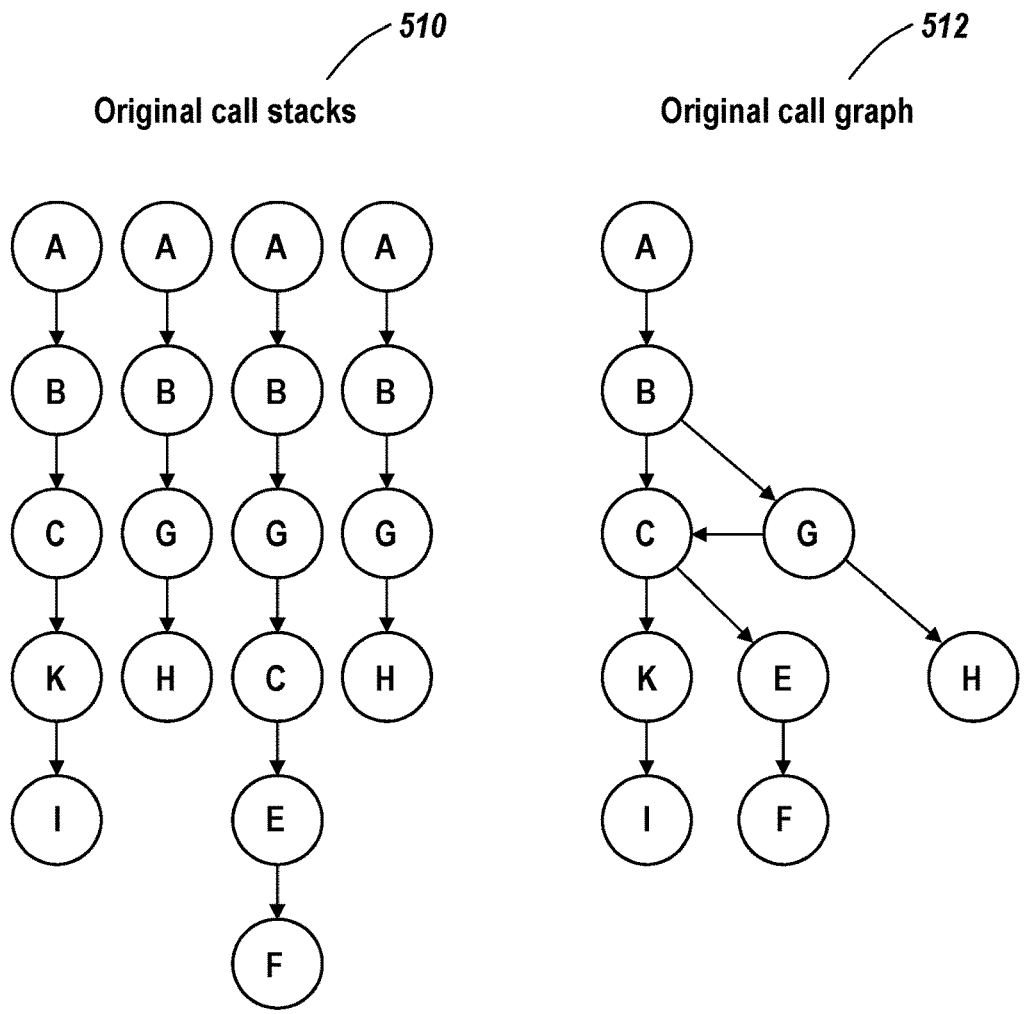
FIG. 5B shows an example of original call stacks and an original call graph.
Figure 5C:
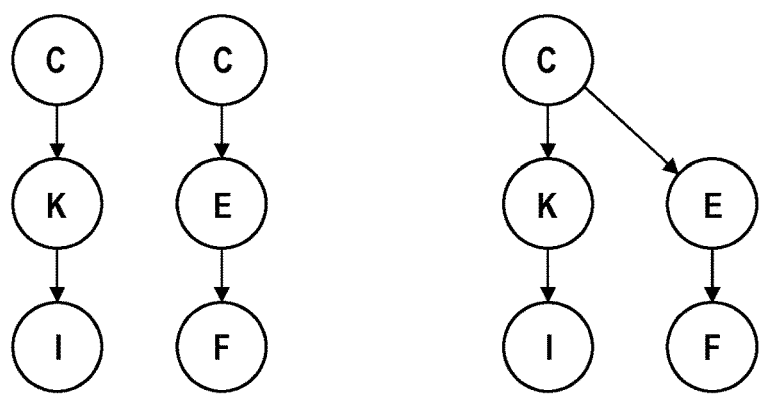
FIG. 5C shows processed call stacks and a new call graph after an anchor point is used for the example of FIG. 5B.

During profiling, multiple call stacks are collected because the profiler collects one call stack when a performance event happens. For example, in the time-based sampling profiler, the profiler may collect 1 call-stack every 10 ms. In the event-based profiler, the profiler may collect 1 call-stack every 1000 disk accesses. The exemplary embodiments may use anchor points to handle recursive functions calls and consolidate call stacks, e.g., for better visualization of the call stacks. An example of the use of anchor points is shown in FIG. 5A. In this example, the call stack 500 has a recursive call chain (A calls B, B calls A, and A calls B, repeatedly for many times). This kind of long call stack (for example, the stack depth may be 200) is not easy for a human to read and has a long processing time. The initial call stack 500 is modified by creating one or more anchor points (see 502). In FIG. 5 A, the anchor point mechanism searches the whole call stack from the leaf node toward the root node to find the first appearance of A. Then the call stack is cut at this point 502, and this point is the new root node. The rest of call stack is discarded. Anchor points will be described in more detail below. This approach makes the recursive call-stack shorter and easier for human to read.

The anchor points may be helpful to filter out unimportant parts of the call stacks and focus on the call stacks that a user is interested in. A call graph may be derived from the call stacks and may summarize the overall calling sequences across the call stacks. Assume that there are 4 original call stacks 510 (see FIG. 5B) and associated call graph 512 contains:

1 A→B→C→K→I
2 A→B→G→H
3 A→B→G→C→E→F
4 A→B→G→H

Suppose that the developer is only interested in the function C and its children functions. In the original call graph is other unnecessary information. The anchor point can be set to C, so the call stacks that contain C are cut at C resulting in the processed call stacks 520 of FIG. 5C. The call stacks that do not contain C may be discarded to produce the new call graph 522.

For a complicated call stack graph that contains thousands of functions, this anchor point technique can make the callstack graph (call graph, flame graph, and other virtualized graph) easier to read.

Figure 6:
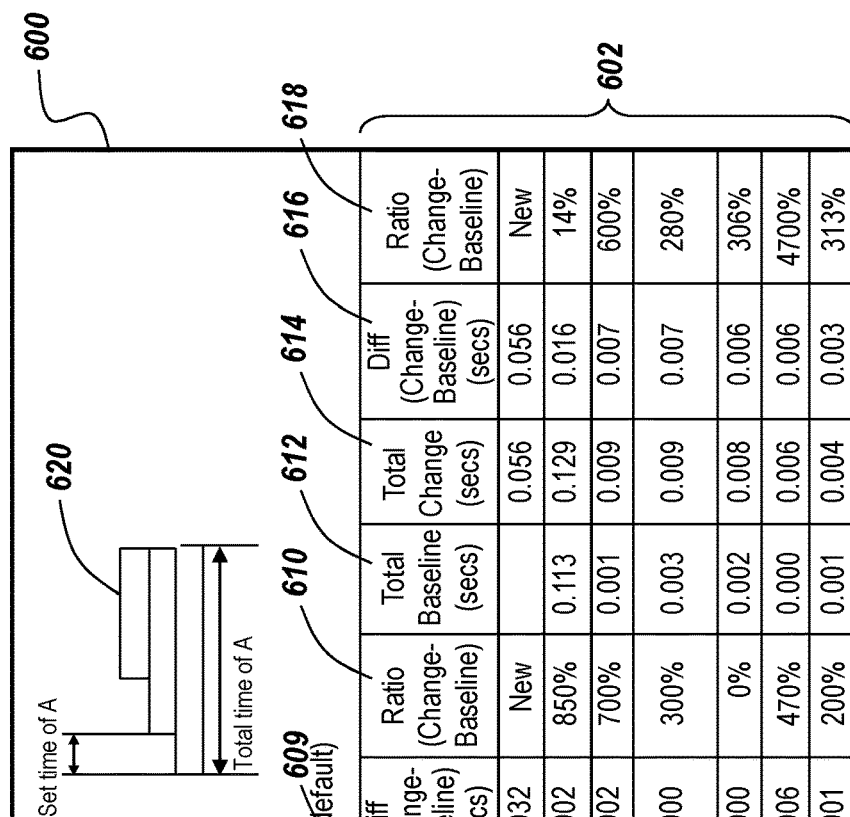
FIG. 6 illustrates an example of a comparison chart comparing a baseline case and a regressed case.

The exemplary embodiments may also generate a comparison table 228 between the regression and baseline for each of the regressions by parsing the call stack information collected in 222 and 224. The comparison table 600 is used here to demonstrate the workflow of how a developer can identify the functions that cause the performance regression. This report is a virtualized output for a developer to read the data, and it may be part of the system. This report may be sent to developer 152. FIG. 6 shows an example of such a comparison table 600 for a test listed in the regression list FIG. 3D. Table 600 uses execution time (full-time and selftime) as an example to demonstrate how to identify the regressed function. In the other scenarios, any measurable performance metric can be used in the table. For example, a row 604 is provided in the body 602 of the table for each callable unit of functionality (e.g., a function). A number of values are provided in a row for each callable unit of functionality. The unit of functionality in row 604 may be visually distinguished by developers to note that it is a new or regressed function based on comparing the selftimes, 606 and 608, and total-times, 612 and 614. In Column 606, a selftime baseline value in seconds may be provided. In Column 608, the selftime change in seconds may be provided. The selftime refers to the time taken for program code of the callable unit of functionality to execute. In Column 609, the difference in self-time of the change minus the baseline is provided. In Column 610, the ratio in self-time of the change to the baseline is provided. In Column 612, the total baseline time is provided, and in Column 614 the change in total time in the execution of code in the associated change set relative to the baseline is provided. The total time refers to the time taken for all invocations within the method to execute including calls to other callable units of functionality in the change set.

An example may be helpful in understanding this process. The total time of a function can be calculated by applying this function as an anchor pointer and processing the call stacks. For example, suppose there are 5 call stacks, and each call stack represents 1 ms.

1 A→B→C→D (A calls B, B calls C, C calls D)
2 A→B→E→F
3 A→B→C→E→F
4 A→D
5 A→G The sampling-based profiler acquires one sample for every time period (for example, 1 ms), and the sample contains a call stack. In this example, the acquired call stack is A (root)→B→C→D (leaf). This means that when the profiler acquires the call stack at that moment, the CPU is executing D. Hence, the profiler contributes this 1 ms execution time to D and 0 ms execution time (self time) to A, B, and C. To know the function C's total time, one may set C as an anchor point. The process goes through each call stack and cuts the call stack at function C. If the call stacks do not have function C (#2, #4, #5), the call stack is ignored. Hence, when setting the anchor point at C, the stack becomes C→D. For this stack, D's self time is 1 ms and its total time is 1 ms. C's total time is 1 ms (it calls a child function D), but its self time is 0 ms because C is not executing in the CPU at this moment. After collecting enough samples, the profiler can get accurate self-time and total-time for each function. In this example, there are two call stacks where function C serves as an anchor point (C→D and C→E→F) so the system knows that C's total time is 2 ms. Because C has called a child function (D and E) on these two stacks (C→D and C→E→F), function C's selftime is 0 ms.

The difference between the change and the baseline is shown in Column 616, and the ratio of the change to the baseline is shown in Column 618. Since the function in row 604 is new, there is no baseline value. The user can sort rows and hide columns. The user can identify the function that causes the regression by comparing the data listed in this table. For example, if the newly added function's selftime is similar to the performance difference between the baseline job and the regressed job and the other functions' selftime and total-time have not changed, this newly added function is the cause of regression. The other example is if a function's selftime and its total-time have increased about x seconds and the other functions' selftime and total-time have not changed. Then, if the performance difference between the baseline job and regressed job is also about x seconds the system can conclude that this function is causing the performance regression.

This table evidences how the system decides if a callable unit of functionality causes the performance regression. The time used in the table can be replaced by other performance metrics. The user can use a call graph (FIG. 5A) to know the call-hierarchy and comparison table 600 together to investigate the performance regression. The automatic testing and performance regression analysis 130 (FIG. 1) of the exemplary embodiments follows the same logic but it consumes the raw data directly.

The data for this comparison table 600 may be stored in one or more data structures in the database. That data is processed to identify regressed callable units of functionality, such as functions. Using the data values that are shown in the comparison table 600, the exemplary embodiments are able to determine which functions have observably regressed and what callable units of functionality are the cause of the performance regression The next step performed by the exemplary embodiments is identification of the root cause 220 by using the profiling information (e.g., both call stack graph to trace caller-callee hierarchy and comparison table for selftime, total-time, and call counts). However, the automated system of the exemplary embodiments does not consume the output sent to the users, and it can process the raw data directly to identify the functions that cause performance regression by walking the caller-callee hierarchy and using the table of FIG. 7. Note: although FIG. 7 uses time as an example, other measurable performance metrics can be used. FIG. 7 follows this rule: when regression happens, the regressed function or the functions on the regressed function's call stacks should have been changed.

For example, assuming there are only two functions in the software, foo( ) and bar( ). In this software, foo( ) is called by bar( ). When foo( )'s selftime increases, there are two possible reasons: (1) foo( ) has been changed, or (2) foo( ) has not been changed but bar( ) calls foo( ) more times. From the time and call counts profiling data, these two cases can be distinguished. Knowing foo( ) or bar( ) is the root cause can help identify the change set, as mentioned in the next paragraph.

The next steps performed by the exemplary embodiments are depicted in the flowchart of FIG. 2C. The system identifies the change sets with the regressed callable units of functionality in step 242 (see 150 in FIG. 1B as well) by following the approach set forth below.

1. Identify the change sets between the baseline job and the regressed job.
2. Search these change sets and identify which change set(s) modified the root-caused functions.

Returning to FIG. 2C, once the change sets with the regressed call units of functionality are identified in step 242, the owners of the change sets are identified in step 244 (see 150 in FIG. 1B) and reports with collected information may be sent to the owners in step 246 (see 152 in FIG. 1B). The reports can contain the collected, analyzed and/or generated information that has been stored in data structures during the analysis process.

FIG. 8 shows an example of the information that may be sent, and the information is a summarized report that contains the tests listed in FIG. 3D. Each row in the table 800 holds information for a performance regression. Thus, row 802 specifies the rate of the regression (column 804) as 23.77 percent. The baseline time specified in column 806 was 0.0387 seconds, whereas the regression time specified in column 808 was 0.0479 seconds. Both 806 and 808 also hold links to the call-stack graphs. Column 810 holds a link to the comparison table and Column 812 identifies the identity of the baseline job. A hyperlink 813 to request a call stack graph (RFF is an acronym for request for flamegraph) may be provided as well. The table 800 also provides information of the regressed function.

Figure 9:
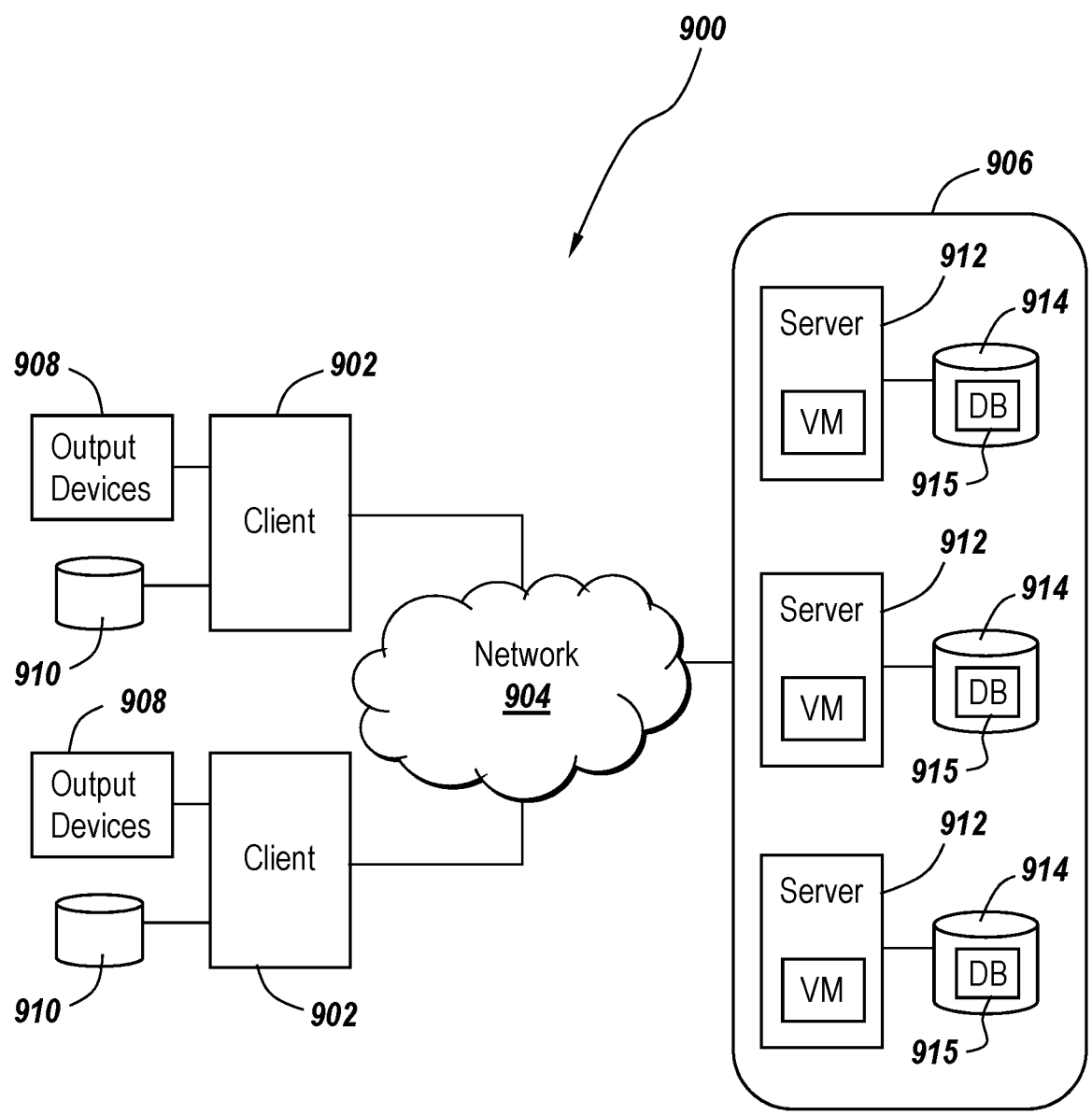
FIG. 9 depicts an example of a suitable distributed environment for practicing exemplary embodiments.

FIG. 9 depicts a distributed environment 900 that is suitable for practicing exemplary embodiments. In this environment clients 902 communicate over a network 904 with a cluster 906 for performing testing and regression analysis. The clients 902 may be compiling devices, such as desktop computers, laptop computers, or tablets, or mobile computing devices such as smart phones. The clients 902 may be connected to output devices 908 and storage 910. In some embodiments, the clients 902 may submit jobs to the testing cluster 906 for testing. The testing cluster 906 may include server computer systems 912 that may execute virtual machines on which the testing is performed. Each server 912 may have access to storage 914. The repository for a revision system may be stored in the storage 914 and revision system software may be stored on the storages 914 and run on the servers 912.

Figure 10A:
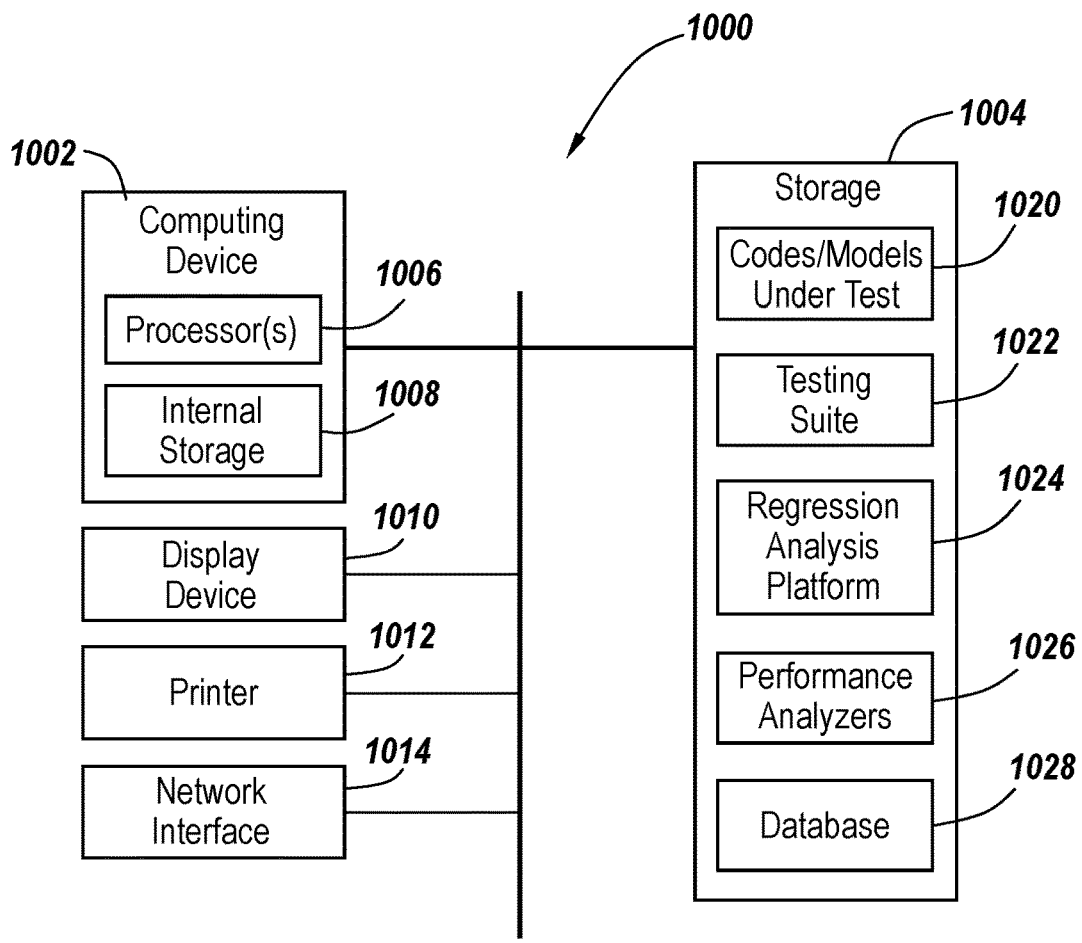
FIG. 10A depicts an example of a server computing device suitable for practicing exemplary embodiments.

The network may be a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN)), Frame Relay, asynchronous transfer mode (ATM), wireless connections (e.g., 802.11), high-speed interconnects (e.g., InfiniBand, gigabit Ethernet, Myrinet) or some combination of any or all of the above. FIG. 10A provides more detail regarding a server computing device. The server computing device 1002 may include one or more processors 1006 for executing computer readable instructions. The processor(s) 1006 may include hardware based logic or a combination of hardware based logic and software to execute instructions on behalf of the server computing device. The processor(s) may include logic that may interpret, execute, and/or otherwise process information contained in, for example, the storage. The information may include computer-executable instructions and/or data that may implement one or more embodiments of the invention. The processor(s) may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processors may include a single core or multiple cores. Moreover, the processor(s) may include a system-on-chip (SoC) or system-in-package (SiP). An example of a processor is the Intel® Xeon® processor available from Intel Corporation, Santa Clara, Calif.

The computer-readable instructions may be stored in the storage 1004. The storage 1004 may include a number of different items as will be discussed below. The server computing device may include one or more tangible non-transitory computer-readable storage media for storing one or more computer-executable instructions or software that may implement one or more embodiments of the invention. The non-transitory computer-readable storage media may be, for example, the storage 1004. The storage 1004 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

Programs may be stored in the internal storage 1008 for execution by the processors(s) 1006. The programs, for example, may include a modeling environment and a technical computing environment (TCE). The TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dassault Systèmes.

An alternative embodiment may implement a TCE in a graphically-based TCE using products such as, but not limited to, Simulink®, Stateflow®, SimEvents®™, Simscape™, etc., by The MathWorks, Inc.; VisSim by Visual Solutions; LabView® by National Instruments; Dymola by Dassault Systèmes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) such as the Object Constraint Language (OCL) or SysML environment.

The computing device 1002 may be connected to a display device 1010, and a printer 1012. The computing device may also have access to a network interface 1014 to connect to a local area network or wide area network, such as the Internet. The storage 1004 may hold items such as code or models that are under test 1020. The code may be standalone code or may be the underlying code for models, such as graphical models. Code for the testing suite 1022 may be stored in a storage 1004. The storage 1004 may also hold the regression analysis platform 1024 that performs the functionality described above. Still further, the storage may hold a number of performance analyzers 1026. The storage may also hold the database 1028.

Figure 10B:
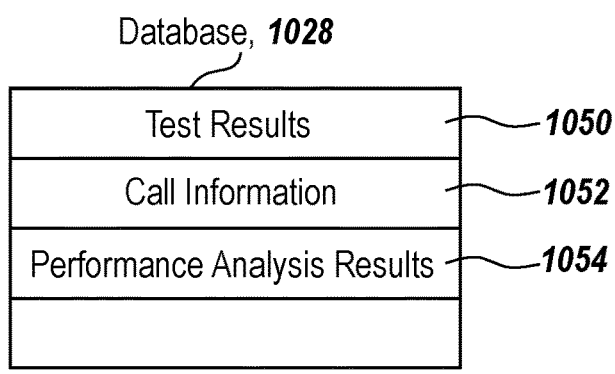
FIG. 10B depicts an example of types of data/information that may be stored in a database in exemplary embodiments.

The database 1028 (FIG. 10B) may be a relational database that holds relational tables of records. As shown in FIG. 10B, the database 1028 may hold test results 1050 for performance tests that have been performed. The database 1028 may also hold call information 1052 for programming code that is tested. The database 1028 may also hold performance analysis results 1054 produced by the performance analyzers.

One or more of the above-described acts may be encoded as computer-executable instructions executable by processing logic. The computer-executable instructions may be stored on one or more non-transitory computer readable media. One or more of the above described acts may be performed in a suitably-programmed electronic device.

The server computing device is illustrative and may take other forms, including but not limited to a computer, workstation, server, network computer, quantum computer, optical computer, Internet appliance, mobile device, a pager, a tablet computer, a smart sensor, application specific processing device, etc. For example, an alternative implementation of the computing device may have fewer components, more components, or components that are in a configuration that differs from the configuration described above. The components depicted in the figures described herein may be implemented using hardware based logic, software based logic and/or logic that is a combination of hardware and software based logic (e.g., hybrid logic); therefore, the components are not limited to a specific type of logic.

The server computing devices 912 and/or the clients 902 may include a virtual machine (VM) for executing the instructions. A virtual machine may be provided to handle a process running on multiple processors so that the process may appear to be using only one computing resource rather than multiple computing resources. Virtualization may be so that infrastructure and resources in the electronic device may be shared dynamically. Multiple VMs may be resident on a single computing device.

One or more exemplary embodiments may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more exemplary embodiments may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor The regression analysis discussed above may be applied for code generated from models for hardware, such as embedded systems, using a code generator like Simulink Coder or Embedded Coder. FIG. 11 shows an example workflow where the regression analysis described above may be applied. Initially, code may be generated for a target for a model 1102. The target may be an embedded system. Alternatively, the code need not be generated for a target bur rather may simply be generated from the model. The code may be run on the target in instances where the code is generated for the target. The performance of the code on the target or in general can be measured using the testing and performance regression analysis environment like that described above (step 1104). In some implementations, a model may be developed by a distributed team and updated on an ongoing basis. Changes to the model may be checked in into a versioning system such as described above. Thus, the model has been updated and programming code is generated from the updated model. The changes to the updated model may affect programming code generated from the updated model (step 1106). As was mentioned above, it may be desirable to run performance tests at the time of checking in the updates into the versioning system to identify any errors. Since the model is to be used to generate programming code, performance tests may be run on the programming code generated from the model as well. This generated code is run, such as on a target or other platform, and the performance is measured such as described above in 1108.

The performance measurements are then used to identify performance regressions via analysis and then apply a performance analyzer and generate call stack graphs and a comparison table, such has been described above (step 1110). The resulting call stack graph and comparison table may be used to identify performance regressions in the callable units of functionality in the generated programming code in step 1112. Once the regressed callable units of functionality have been identified in 1112, the model changes that caused the regression may be identified. The system is able to map changes in generated code to modification to model. As such, the model change that caused the regression may be identified in 1114. The model may then be updated to fix the performance regression that arises in the code generated for execution on the target. This can be done quickly and efficiently using the approach described herein. This allows a developer to quickly fix a model so that code generated from the model for a target performs well and as intended.

Figure 12:
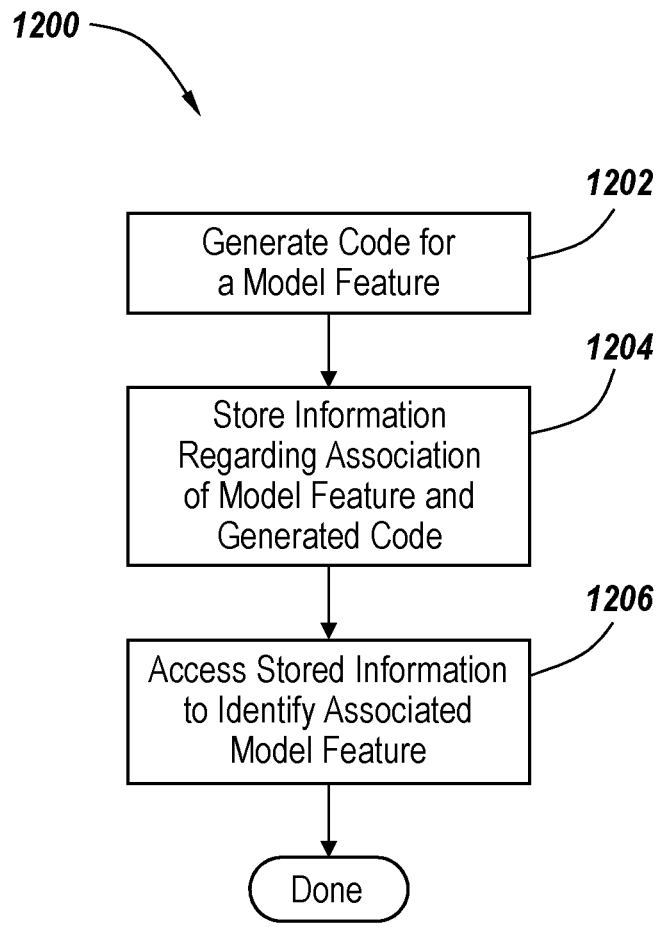
FIG. 12 is a flowchart of an example of steps performed to identify what model features are associated with components in the generated programming code in an exemplary embodiment.

FIG. 12 shows a flowchart 1200 depicting examples of steps performed to identify the changes in the model that caused the change in the programming code that is the cause of the performance regression observed on the target hardware. Initially, code is generated for a model feature (step 1202), e.g., automatically using a code generator, such as Simulink Coder from The MathWorks, Inc. of Natick, Mass. or manually. Information regarding the association of the model feature and the associated generated programming code is stored (step 1204). Suitable approaches for storing this information are described in U.S. Pat. No. 8,667,470, entitled "Traceability in a Modeling Environment," which was issued on Mar. 4, 2014, in U.S. application Ser. No. 16/007,605, entitled "Determining and Providing Correlations Between Semantic Constructs in a Representation of Functionality and Semantic Constructs in Another Representation of Functionality," which was filed on Jun. 13, 2019, and in provisional Application No. 62/778,101, entitled "Identification and Visualization of Associations Among Code Generated From a Model and Sources That Affect Code Generation," which was filed on Dec. 11, 2018, the contents of which are explicitly incorporated by reference herein.

This information is then used to identify the associated model feature when the portion of the generated programming code has been identified as causing the performance regression (step 1206). Suitable approaches for using this information to identify the associated model features are described in U.S. Pat. No. 8,667,470, entitled "Traceability in a Modeling Environment," which issued on Mar. 4, 2014, in U.S. application Ser. No. 16/007,605, entitled "Determining and Providing Correlations Between Semantic Constructs in a Representation of Functionality and Semantic Constructs in Another Representation of Functionality," which was filed on Jun. 13, 2019, and in provisional Application No. 62/778,101, entitled "Identification and Visualization of Associations Among Code Generated From a Model and Sources That Affect Code Generation," which was filed on Dec. 11, 2018, the contents of which are explicitly incorporated by reference herein.

While the present invention has been described with reference to exemplary embodiments herein, those skilled in the art will appreciate the various changes in form and detail may be made without departing from the intended scope of the present invention as defined in the appended claims.

What is claimed as new and desired to be protected by Letters Patent of the United States is:

1. A method performed by a processor of a computing device, comprising:
   recording performance information during performance tests performed on programming code;
   identifying a performance regression that occurred in multiple of the performance tests, the identifying comprising:
   analyzing the recorded performance information to identify a performance change reflected in one or more performance metrics that occurred at in the multiple performance tests, and
   determining whether the performance regression is observable in that the performance change in at least one of the one or more performance metrics for the multiple performance tests surpasses a tolerance level;
   analyzing the identified observable performance regression to generate a data structure for callable units of functionality of the programming code executed during performing the performance tests, the data structure containing call relationships among the callable units of functionality of the programming code and performance information of the callable units of functionality of the program code;
   for each of at least two callable units of functionality, analyzing the data structure to identify a cause of the identified performance regression; and
   outputting information about the identified cause on an output device.

2. The method of claim 1, wherein at least one run of the running of the performance test is run on a different platform than a platform on which the performance test has been run.

3. The method of claim 1, wherein the output information includes an identification of at least one change set for the identified portion of the programming code that likely is the identified cause of the identified performance regression.

4. The method of claim 1, wherein the performance test measures at least one of the performance metrics of memory usage, processor time, number of calls, throughput, network traffic, network time, disk time or number of input/output operations.

5. The method of claim 1, wherein the programming code is for one of a graphical model or a textual model.

6. The method of claim 5, wherein the programming code is for a graphical model, the cause of the performance regression includes a component in the programming code and wherein the method further comprises identifying a change in the graphical model that caused the generation of the performance regression includes a component in the programming code and wherein the method further comprises identifying a change in the graphical model that caused the generation of the component.

7. The method of claim 1, wherein the determining that the performance regression is observable comprises rerunning the one or more performance tests to determine that the performance change is reproducible.

8. The method of claim 1, wherein the tolerance level is configurable.

9. The method of claim 1, wherein the outputting information comprises generating a report regarding the identified cause.

10. The method of claim 9, further comprising determining an owner of the at least one callable unit functionality that is the identified cause and sending the report to the owner.

11. The method of claim 1, wherein the identified cause of the identified performance regression is at least one callable unit of functionality in the programming code.

12. The method of claim 11, wherein the identified at least one callable unit of functionality is at least one of a function, a procedure, a subroutine, a method or an element of a model.

13. The method of claim 1, wherein the programming code is generated from a graphical model for a target system, the performance tests are run on the target system and the cause of the performance regression includes a component in the programming code and wherein the method further comprises identifying a change in the graphical model that caused the generation of the component.

14. A method performed by a processor of a computing device, comprising:
  recording performance information during performance tests performed on programming code;
  identifying a performance regression that occurred multiple of the performance tests, the identifying comprising:
    analyzing the recorded performance information to identify a performance change reflected in one or more performance metrics that occurred in the multiple performance tests, and
    determining whether the performance regression is observable in that the performance change in at least one of the one or more metrics for the multiple performance tests surpasses a tolerance level;
  analyzing the identified observable performance regression to generate a call graph for the callable units of functionality of the programming code executed during the performance tests, the call graph containing call relationships among the callable units of functionality of the programming code and performance information of the callable units of functionality of the program code;
  processing the call graph by applying at least one anchor point to the call graph, for each of at least two callable units of functionality, analyzing the call graph to identify a cause of the identified performance regression; and
  outputting information about the identified cause on an output device.

15. A non-transitory computer-readable storage medium storing instructions that cause a processor of a computing device to perform the following:
  recording performance information during performance tests performed in programming code;
  identifying a performance regression that occurred at multiple of the performance tests, the identifying comprising:
    analyzing recorded performance information to identify a performance change reflected in one or more performance metrics that occurred in the multiple performance tests, and
    determining whether the performance regression is observable in the performance change in at least one of the one or more performance metrics for the multiple performance tests surpasses a tolerance level;
  analyzing the identified observable performance regression to generate a data structure for callable units of functionality of the programming code executed during performing the performance tests, the data structure containing call relationships among the callable units of functionality of the program code and performance information of the callable units of functionality of the programming code; for reach of at least two callable units of functionality, analyzing the data structure to identify a cause of the identified performance regression; and
  outputting information about the identified cause on an output device.

16. The non-transitory computer-readable storage medium of claim 15, wherein at least one run of the rerun performance test is run on a different platform than a platform on which the given run of the performance test has been run.

17. The non-transitory computer-readable storage medium of claim 15, wherein the output information includes an identification of at least one change set for the identified portion of the programming code that likely is the identified cause of the identified performance regression.

18. The non-transitory computer-readable storage medium of claim 15, wherein the performance test measures at least one of the performance metrics of memory usage, processor time, number of calls, throughput, network traffic, network time, disk time or number of input/output operations.

19. The non-transitory computer-readable storage medium of claim 15, wherein the programming code is for one of a graphical model or a textual model.

20. The non-transitory computer-readable storage medium of claim 19, wherein the programming code is for a graphical model, the cause of the performance regression includes a component in the programming code and wherein the medium further stores instructions for identifying a change in the graphical model that caused the generation of the performance regression includes a component in the programming code and for identifying a change in the graphical model that caused the generation of the component.

21. The non-transitory computer-readable storage medium of claim 15, wherein the determining that the performance regression is observable comprises rerunning the one or more performance tests to determine that the performance change is reproducible.

22. The non-transitory computer-readable storage medium of claim 15, wherein the tolerance level is configurable.

23. The non-transitory computer-readable storage medium of claim 15, wherein the outputting information comprises generating a report regarding the identified cause.

24. The non-transitory computer-readable storage medium of claim 23, further comprising determining an owner of the at least one callable unit functionality that is the identified cause and sending the report to the owner.

25. The non-transitory computer-readable storage medium of claim 15, wherein the identified cause of the identified performance regression is at least one callable unit of functionality in the programming code.

26. The non-transitory computer-readable storage medium of claim 25, wherein the identified at least one callable unit of functionality is at least one of a function, a procedure, a subroutine, a method or an element of a model.

27. The non-transitory computer-readable storage medium of claim 15, wherein the programming code is generated from a graphical model for a target system, the performance tests are run on the target system and the cause of the performance regression includes a component in the programming code and wherein the storage medium further storage instructions for identifying a change in the graphical model that caused the generation of the component.

28. A non-transitory computer-readable storage medium storing instructions that cause a processor of a computing device to perform the following:
  recording performance information during performance tests performed on programming code;
  identifying a performance regression that occurred multiple of the performance tests, the identifying comprising:

analyzing the recorded performance information to identify a performance change reflected in one or more performance metrics that occurred in the multiple performance tests, and determining whether the performance regression is observable in that the performance change in at least one of the one or more metrics for the multiple performance tests surpasses a tolerance level;

analyzing the identified observable performance regression to generate a call graph for the callable units of functionality of the programming code executed during the performance tests, the call graph containing call relationships among the callable units of functionality of the programming code and performance information of the callable units of functionality of the program code;

processing the call graph by applying at least one anchor point to the call graph;

for each of at least two callable units of functionality, analyzing the call graph to identify a cause of the identified performance regression; and outputting information about the identified cause on an output device.

29. A computing device, comprising:

a memory storing processor-executable instructions;

a processor for executing the processor-executable instructions to perform the following:

recording performance information during performance tests performed on programming code;

identifying a performance regression that occurred in multiple of the performance tests, the identifying comprising:

analyzing the recorded performance information to identify a performance change reflected in one or more performance metric that occurred in the multiple performance tests, and determining whether the performance regression is observable in that the performance change in at least one of the one or more performance metrics for the multiple performance tests surpasses a tolerance level;

analyzing the identified observable performance regression to generate a data structure for callable units of functionality of the programming code executed during performing the performance tests, the data structure containing call relationships among the callable units of functionality of the programming code and performance information of the callable units of functionality of the program code;

for each of at least two callable units of functionality, analyzing the data structure to identify a cause of the identified performance regression; and outputting information about the identified cause on an output device.

* * * * *